(No Model.)  2 Sheets—Sheet 2.
F. NISHWITZ.
HARROW.
No. 527,875. Patented Oct. 23, 1894.
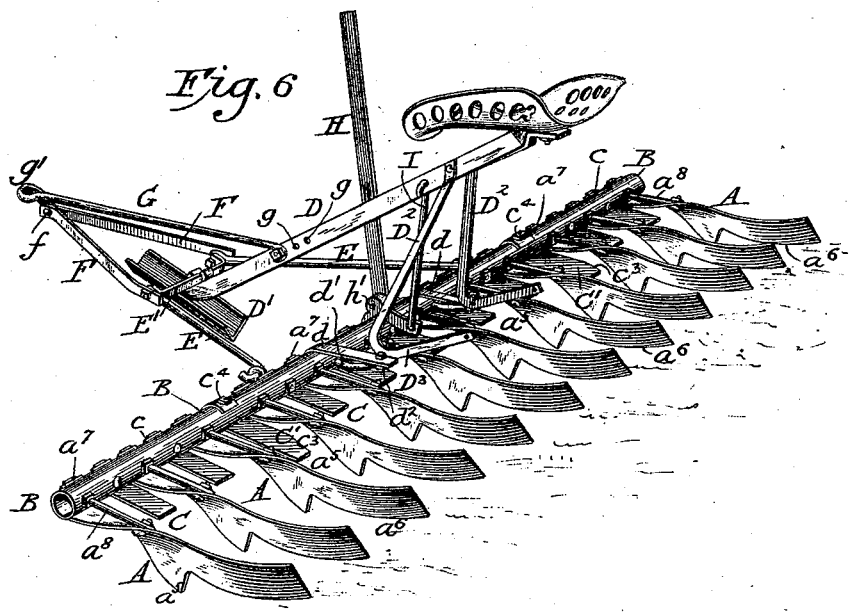
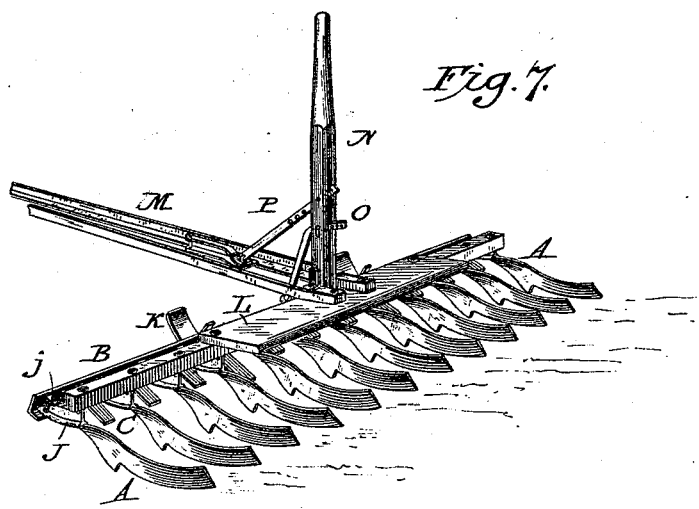
Witnesses
Sidney P. Hollingsworth
B. Washington Miller
Inventor
Frederick Nishwitz
by Baldwin, Davidson & Wight
his Attorneys

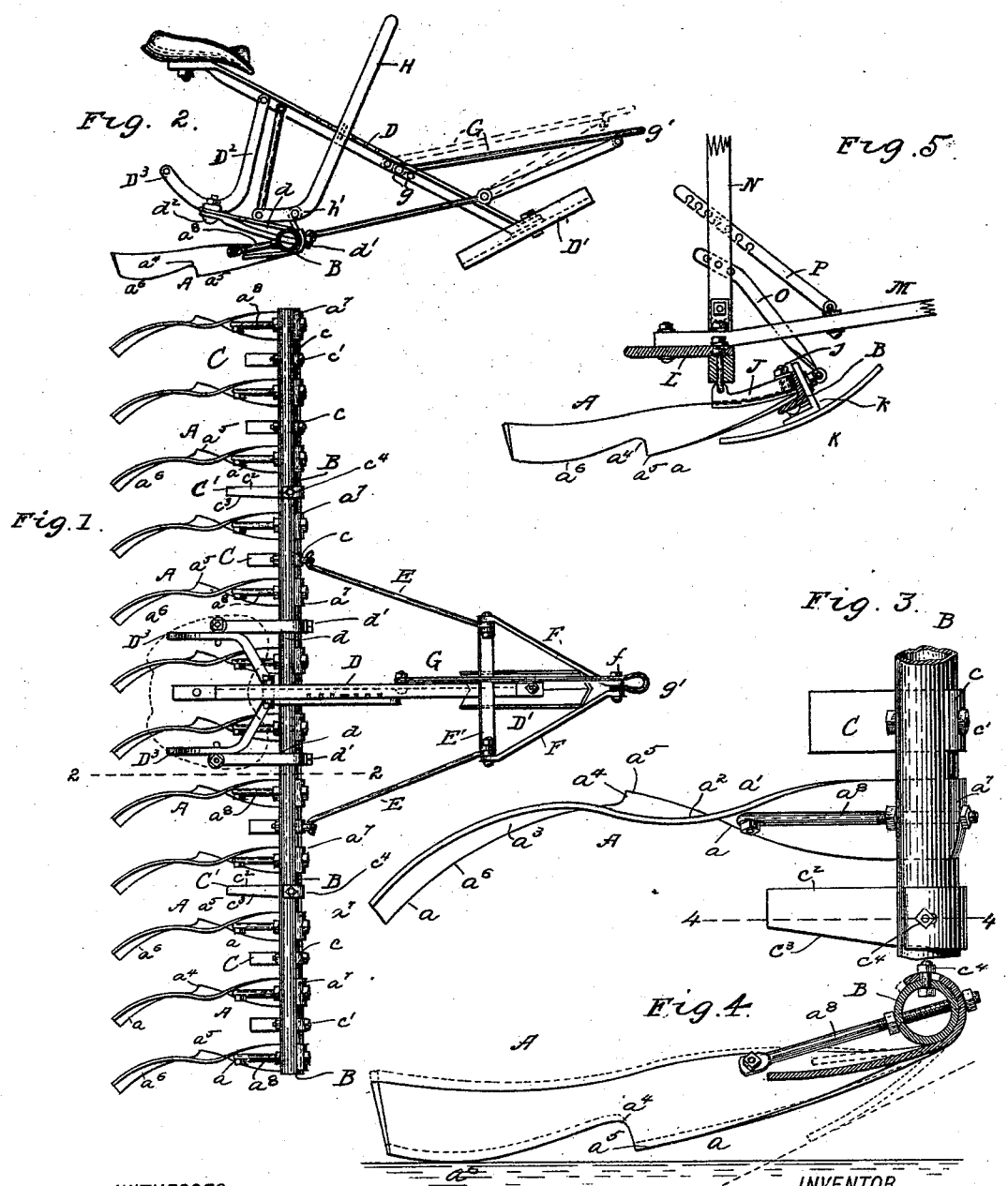

UNITED STATES PATENT OFFICE.

FREDERICK NISHWITZ, OF MILLINGTON, NEW JERSEY.

HARROW.

SPECIFICATION forming part of Letters Patent No. 527,875, dated October 23, 1894.

Application filed February 20, 1892. Serial No. 422,303. (No model.)

*To all whom it may concern:*

Be it known that I, FREDERICK NISHWITZ, a citizen of the United States, residing at Millington, in the county of Morris and State of New Jersey, have invented certain new and useful Improvements in Harrows, of which the following is a specification.

My invention relates to that class of harrows or pulverizers well known to the trade as "Acme Harrows." The general type of machine comprises a cross or gang bar or bars, from which project rearwardly trailing teeth, and usually between the connections of the teeth on the gang bar I place short spurs or crushers. The general style of machine is shown in numerous patents heretofore granted to me, as for instance in Patents No. 262,307, dated August 8, 1882, and No. 262,820, dated August 15, 1882. The general object of my invention is to improve the construction and efficiency of the apparatus and to reduce its cost.

The organizations and details constituting my present invention are hereinafter described and specifically claimed.

In the accompanying drawings: Figure 1 is a plan view with the driver's seat removed, its location being indicated by dotted lines. Fig. 2 is a transverse section on the line 2 2 of Fig. 1; Fig. 3, a detail view on an enlarged scale of a section of the gang bar, showing a trailing tooth and two spurs or clod crushers mounted thereon; Fig. 4, a transverse section through the same on the line 4 4; Fig. 5, a transverse section of a machine of a different type in some respects. Fig. 6 is a perspective view of my improved harrow. Fig. 7 is a perspective view of the modification of my harrow.

The first part of my invention relates to the trailing teeth. They are formed substantially as follows: A flat bar or plate A, preferably of steel, and preferably rolled in the process of manufacture to a cutting edge $a$ on one side is given a quarter turn at $a'$ relatively near one end, so that that end occupies a horizontal position, or in other words rests against the under face of the gang bar B. The effect of this turn is to carry down the right hand edge $a$, which is the cutting edge, and in the rear of the partial turn $a'$ the tooth or plate of steel occupies a substantially vertical position, so that the edge $a$ bears upon and cuts into the soil. The tooth is sinuously or reversely curved, as seen at $a^2\ a^3$, and that part of the cutting edge $a$ that extends to the left (as viewed in the drawings) of a vertical line passing through the upper edge or back of the tooth is cut out at $a^4$, so as to leave a projecting cutter $a^5$ which enters the soil. In the rear of this portion the cutting edge is curved in a reverse direction so as in effect to form another cutting tooth $a^6$, the lateral pressure of which upon the soil is opposite to that of the tooth or cutting edge $a^5$. The result of this construction is a sinuous or reversely curved trailing tooth having two cutting portions which bear with approximately equal pressure laterally upon the soil in both directions, so that with a machine equipped with such teeth, there is little, if any, tendency to sidewise movement.

In my Patent No. 262,307 I show a sinuously or reversely curved trailing tooth, the front portion of which is horizontal with reference to the gang bar, but the cutting edge of that tooth is a continuous rocker shaped cutting edge, and in that respect is materially distinguished from the tooth shown herein.

In my Patent No. 262,308, I show a single tooth whose cutting edge is cut away about midway of its length so as to form two practically distinct cutting spurs or teeth that are turned in reverse directions, but that tooth differs materially from the one herein described in two important particulars: First it is not sinuously or reversely curved in a manner similar to the tooth herein shown, and, secondly, it is not turned at the front so that that end lies in a horizontal position with reference to the gang bar.

In my improved machine the cutting spurs or teeth $a^5\ a^6$ have an effect upon the soil analogous to that of two independent teeth cutting in reverse directions and therefore the machine will run in a straight line, or substantially so, and as the front part of the tooth is flat it operates as a crusher to break up clods, &c. I may, therefore, with such teeth employ a single gang bar and the machine may or may not have a tongue. As the result of practical experiments I prefer to dispense with the tongue and provide a draft frame to which the team is hitched, and the construction of which is hereinafter described. In addition to the peculiar formation of the teeth already described, I prefer that they shall also be turned up at their front ends, so that they lie against or embrace both the under and front sides or faces of the gang bar. As the gang bar shown in the drawings is cylindrical, the turned up front $a^7$ of the tooth is curved to fit it.

The next part of my invention relates to the gang bar and the manner of securing the teeth A, and the crushing spurs C thereto. The gang bar B is tubular, being preferably formed of wrought iron pipe. I adopt a bar of this character because it possesses great strength, is relatively light and correspondingly cheap, and is capable of resisting the severe torsional strains which are thrown upon it when the harrow is in action. The crushing spurs C are relatively short, flat bars of metal, and are arranged between the trailing cutting teeth. They project to the rear of the bar, a distance corresponding approximately with the effective flat crushing parts of the teeth. Their front ends $c$ are curved up in the same manner as are the ends of the teeth and they are rigidly held in position by bolts $c'$ that pass through the turned up ends of the spurs and through the tubular gang bar. The teeth A are similarly secured by bolts $a^8$ that pass through the turned up ends of the teeth, through the tubular gang bar, and are extended to the backs or upper edges of the teeth at a point where the teeth assume an approximately vertical position. The end of each rod or bolt $a^8$ is bolted to its tooth near the back or upper edge of the tooth. There is a nut on the front end of each bolt and a check nut in rear of the gang bar. By this construction the tooth is not only rigidly secured to the gang bar, but the securing bolt serves as a stiff brace for the front flat portion of the tooth which might be liable to bend by working strains thereon. These devices perform also a further function. By loosening the nut at the rear of the gang bar and screwing up the outer nut the bolt or brace may be drawn forward; that is to say the portion projecting to the rear of the gang bar is shortened. The effect of this is to raise the tooth as the strain of the bolt will cause the flat part of the tooth to bend. Similarly the tooth may be thrown down by loosening the outer nut and turning the one at the rear of the gang bar. The user of the harrow, may, therefore, readily adjust the angular inclination of the teeth with reference to the gang bar to compensate wear, adapt the harrow to work in various kinds of soil, or keep the teeth in line.

To provide for the transportation of the machine two of the spurs marked C', one on each side of the harrow about midway between the center and the end are elongated as shown. They may be straight on the side or edge $c^2$ next the tooth whose cutting edge curves away from it, but the opposite side which is next the edge of a tooth that curves toward it is cut away on an angle, as shown at $c^3$. This is done to prevent the wedging of clods or other obstructions. These elongated spurs C' serve as runners for the transportation of the machine as hereinafter described. They are adjustably mounted upon the gang bar as follows: Their front ends are preferably curved to such an extent as to embrace the bottom, front and top faces of the gang bar. They are slotted at the top and are held securely in position by a clamping bolt $c^4$ that passes through the slot and the upper side of the gang bar. By loosening this bolt the spur or runner C' may be turned upon the gang bar and caused to assume different angular positions with reference thereto, as indicated by the full and dotted lines in Fig. 4.

The next part of my invention relates to the supporting of the seat and the adjusting mechanism for throwing the trailing teeth up or down to regulate the depth of cut. The seat supporting standard D which may be of angle iron, in the construction shown forms a part of the draft frame. Its front end projects below the draft frame proper and has bolted to it a shoe D' which serves to support the front part of the machine when the draft of the team is slackened and in turning. The rear or upper end of the seat standard is supported by two bars or standards $D^2$ and the points of support upon which they rest are in rear of the gang bar and are provided as follows: Each support consists of a flat bar $d$ of iron projecting rearwardly from the top face of the gang bar and held in place in the following manner: The end of the bar $d$ is curved so as to embrace the top and front face of the gang bar. Its curved end overlaps with the curved end of one of the crushers and both are held by a bolt $d'$ which passes through the curved ends of the crusher and bar, and in rear of the gang bar the bolt $d'$ projects approximately to the end of the rod $d$ being curved or bent upwardly so as to form a bracket or brace for the rod. The flattened end of the bolt $d'$ and the end of the rod $d$ are secured together by a bolt $d^2$ and at this point the seat standard supports $D^2$ are pivoted as shown or in any suitable manner. As illustrated in the drawings these supports are curved and extend rearwardly from their point of pivoting, as indicated at $D^3$, thus forming a cradle or receptacle in which a beam or other weight may be placed, to increase the weight of the harrow when required in certain classes of soil. At suitable distances on each side of the transverse center of the harrow one of the bolts that serves to secure one of the crushing spurs is formed with an eye in its front end. A link E pivotally engages this eye and extends forward to a cross bar E' bolted to the seat standard, the links E E being pivotally connected with the ends thereof. Other pivoted links F F extend forward from each end of the cross bar E' and are connected at their ends by a pivot bolt $f$, which also engages the end of an adjusting draft link G, the rear end of which passes above the cross bar E' and is adjustably connected with the seat standard by means of an adjusting bolt which passes through the end of the link G and through any one of the series of apertures $g$ in the seat standard. The forward end of the link G just in advance of its pivotal connection is formed with an eye for the connection of the whiffle-tree hook or other draft device. The draft eye $g'$ of the link G may be raised and lowered as indicated by the dotted lines in Fig. 2, by the adjustment of the rear end of the link on the seat standard D. This adjustment is for the purpose of raising and lowering the point at which the draft is applied to suit teams of horses of varying sizes.

The adjusting devices for raising and lowering the seat may be arranged substantially as follows: A hand lever H, a lug on which may engage a rack formed by notches cut in the edge of the seat standard which may be of angle iron, is pivoted at $h'$ just above the gang bar to a slight projection that may be the end of one of the crushing spurs extending up from the gang bar, and is curved to the rear of the pivot as shown. This end of the lever is connected with the vertical link I pivoted to the seat standard. Obviously when the driver draws the lever toward him the trailing teeth will be depressed and the gang bar elevated. In this improved machine the weight of the driver is supported in rear of the gang bar, and is therefore, more effective in causing the teeth to enter the soil.

The runners or spurs C' may be so adjusted that when the gang bar is thrown down to the lowest position and the trailing teeth correspondingly elevated, the machine will be supported on these runners and may readily be transported from place to place.

By turning up the front ends of the teeth so that they embrace the front of the gang bar the teeth are supported against lateral strains.

So far as I am aware I am the first to provide a rearwardly trailing harrow tooth substantially of the general character herein set forth, with a brace to sustain it against vertical strains and prevent the bending of the tooth near the gang bar. I am also, so far as I am aware, the first to provide such a tooth with means for adjusting its angular relation to the gang bar as above set forth.

The improved harrow teeth herein described may be used in machines differing somewhat in general structure from that already described: for instance, in such a machine as is shown in Figs. 5 and 7. In this machine the gang bar B is of angle iron and the front flat ends of the teeth are secured to it by castings J one for each tooth that lie upon the top of the tooth, a securing bolt $j$ passing through the casting, the tooth and the under side of the angle iron cross bar. Such a machine may have runners K supported or carried by brackets $k$ which lie against the front face of the gang bar and are secured by a clamping bolt which permits of their adjustment. The riding platform L is supported upon the ends of the castings J by means of eye bolts. The tongue M which I may use in this type of harrow is bolted to the riding platform. N is the adjusting lever. O is an adjustable link that extends from the gang bar and is adjustably connected with the lever N by means of a series of apertures in the end of the link. P is a notched detent lever pivoted on the tongue and passing through the slot in the lever and engaging a cross-bolt therein. A more detailed description of this particular harrow is deemed unnecessary.

I have described and illustrated a practical, efficient and economical embodiment of my invention, and while I believe the details of construction to be novel and important, the invention in its broad aspect may be embodied in other forms of apparatus differing more or less in detail, without departing from the spirit of my invention, and some features of the invention may be used without others in machines differing in constructions from that herein shown.

I claim as my invention—

1. A trailing harrow tooth formed substantially as set forth of a strip or plate of metal having a flat or horizontal front portion and a sinuously bent or reversely curved cutting portion having distinct or separate cutting edge projections, as $a^5$, and $a^6$, acting upon the soil in opposite directions.

2. A trailing harrow tooth formed substantially as set forth of a strip or plate of metal, one edge of which is rolled to a cutting edge, having a flat or horizontal front portion and a sinuously bent or reversely curved cutting portion having distinct or separate cutting edge projections, as $a^5$, and $a^6$, acting upon the soil in opposite directions.

3. A trailing harrow tooth formed substantially as set forth of a strip or plate of metal having a flat or horizontal front portion and a sinuously bent or reversely curved cutting portion having distinct or separate cutting edge projections, as $a^5$, and $a^6$, acting upon the soil in opposite directions, in combination with a gang bar on which said tooth is mounted.

4. The combination of a gang bar; a rearwardly projecting trailing cutting tooth having a horizontal or flat portion extending a short distance to the rear of the bar, and a brace extending rearwardly from the bar to the tooth, for the purpose set forth.

5. The combination of the gang bar, a trailing tooth having its end curved to embrace the bar, and a bolt passing through the curved end of the tooth and the bar and extending rearwardly and attached to the tooth, for the purpose set forth.

6. The combination of the gang bar, a trailing tooth having its end curved to embrace the bar, a bolt passing through the curved end of the tooth and the bar and extending rearwardly and attached to the tooth, and means for lengthening or shortening the rearwardly projecting portion of the bolt, for the purpose set forth.

7. The combination of a gang bar, a series of sinuously or reversely curved trailing cutting teeth projecting rearwardly from the bar and having horizontal flat portions bearing on the bar, rearwardly extending bolts or bars for bracing the teeth against vertical strain, and means for bracing the teeth against lateral strains.

8. The combination of the gang bar, a series of rearwardly projecting trailing teeth mounted thereon, draft devices, and a cradle or receptacle arranged above the teeth and in rear of the gang bar, for the purpose set forth.

9. The combination of a gang bar, a series of trailing teeth carried thereby, a seat standard supported over the teeth in rear of the gang bar, an adjusting lever pivoted on the gang bar and a link connecting the lever and the seat standard.

10. The combination of the gang bar teeth carried thereby, a seat standard projecting rearwardly over the gang bar, the shoe carried by the end of the seat standard and the draft frame, substantially as set forth.

11. The combination of the gang bar teeth carried thereby, the seat standard, the cross bar thereon, the pivoted links, connecting the gang bar and cross bar, the pivoted links projecting forward from the gang bar and the pivoted draft link G connected with the seat standard.

12. The combination of the gang bar, the teeth carried thereby, the seat standard, the cross bar thereon, the pivoted links connecting the gang bar and cross bar, the pivoted links projecting forward from the gang bar, the pivoted draft link G connected with the seat standard, and the shoe on the end of the seat standard.

13. The harrow herein described, consisting of a transverse gang bar, the trailing teeth having horizontal portions and mounted thereon, the teeth being reversely or sinuously curved and having independent cutting portions $a^5$ and $a^6$ bearing upon the soil in opposite directions, and draft devices.

14. The harrow herein described, consisting of a transverse gang bar, the trailing teeth having crushing portions and mounted thereon, the teeth being reversely or sinuously curved and having independent cutting portions $a^5$ and $a^6$ bearing upon the soil in opposite directions, draft devices and means for throwing the teeth up or down to regulate the depth of cut.

15. The combination of a draft frame, a transverse gang bar in rear thereof, and hinged thereto so as to rise and fall, a lever for raising and lowering the gang bar, and rearwardly projecting trailing cutting teeth sinuously or reversely curved and each having independent cutting projections $a^5$, $a^6$ that bear upon the soil in opposite lateral directions.

16. The combination of a draft frame, a transverse gang bar hinged thereto, trailing teeth carried by the gang bar, each tooth having a horizontal portion adjacent to the gang bar and a vertical cutting portion curved in reverse directions and having two cutting projections $a^5$ $a^6$ that exert lateral pressure upon the soil in opposite directions, a seat standard supported above the gang bar, an adjusting lever pivoted on the gang bar and a link connecting the lower end of the lever and the seat standard.

17. In a harrow the combination of a draft frame, a single transverse gang bar, and trailing teeth carried by the gang bar, each tooth being reversely or sinuously curved and having its cutting edge irregularly formed as at $a^5$ $a^6$ to present two cutters to the soil that exert lateral pressure thereon in opposite directions, substantially as set forth.

In testimony whereof I have hereunto subscribed my name.

FREDERICK NISHWITZ.

Witnesses:
CHAS. E. COOK,
R. A. B. MUNSON.